United States Patent
Sato

(10) Patent No.: US 10,717,416 B2
(45) Date of Patent: Jul. 21, 2020

(54) WASHER FLUID HEATING DEVICE

(71) Applicant: MURAKAMI CORPORATION, Shizuoka (JP)

(72) Inventor: Hidenori Sato, Shizuoka (JP)

(73) Assignee: MURAKAMI CORPORATION, Shizuoka (JP)

( * ) Notice: Subject to any disclaimer, the term of this patent is extended or adjusted under 35 U.S.C. 154(b) by 485 days.

(21) Appl. No.: 15/324,014

(22) PCT Filed: Jun. 5, 2015

(86) PCT No.: PCT/JP2015/066391
§ 371 (c)(1),
(2) Date: Jan. 5, 2017

(87) PCT Pub. No.: WO2016/009742
PCT Pub. Date: Jan. 21, 2016

(65) Prior Publication Data
US 2017/0203733 A1 Jul. 20, 2017

(30) Foreign Application Priority Data
Jul. 16, 2014 (JP) .................................. 2014-145788

(51) Int. Cl.
*B60S 1/48* (2006.01)
*F24H 1/18* (2006.01)
(Continued)

(52) U.S. Cl.
CPC ................ *B60S 1/488* (2013.01); *B60S 1/50* (2013.01); *F24H 1/0018* (2013.01); *F24H 1/185* (2013.01);
(Continued)

(58) Field of Classification Search
CPC .......... B60S 1/488; B60S 1/50; F24H 1/0018; F24H 1/185; H05B 2203/021; H05B 1/0244; H05B 3/82
(Continued)

(56) References Cited

U.S. PATENT DOCUMENTS 3,384,123 A * 5/1968 Saddison ................ B60S 1/488
137/301
3,846,867 A * 11/1974 Bryant ...................... B60S 1/50
15/250.002
(Continued)

FOREIGN PATENT DOCUMENTS

JP 59-158934 9/1984
JP 60171771 A * 9/1985 ......... H01L 27/0629
(Continued)

OTHER PUBLICATIONS

Search Report issued in Japan Patent Application No. PCT/JP2015/066391, dated Jun. 30, 2015.
(Continued)

*Primary Examiner* — Dana Ross
*Assistant Examiner* — Kuangyue Chen
(74) *Attorney, Agent, or Firm* — GreenBlum & Bernstein, P.L.C.

(57) ABSTRACT

A washer fluid heating device includes: a cover portion attached to one end of a container to face an accommodation space of a washer fluid; heating means that includes a case having a proximal end portion attached to the cover portion and extending toward the accommodation space, and a heating unit provided inside the case to heat the washer fluid inside the accommodation space through the case; and a detector for detecting a no-water burning state generated due to a decrease in washer fluid inside the accommodation space. The detector is provided inside the case and disposed (Continued)

on a side of the proximal end portion of the case from the healing unit.

19 Claims, 4 Drawing Sheets

(51) Int. Cl.
  *H05B 3/82* (2006.01)
  *F24H 1/00* (2006.01)
  *B60S 1/50* (2006.01)
  *H05B 1/02* (2006.01)

(52) U.S. Cl.
  CPC ............ *H05B 1/0244* (2013.01); *H05B 3/82* (2013.01); *H05B 2203/021* (2013.01)

(58) Field of Classification Search
  USPC ........................................................ 392/441
  See application file for complete search history.

(56) References Cited

U.S. PATENT DOCUMENTS

| | | | | |
|---|---|---|---|---|
| 4,700,040 A * | 10/1987 | Driggers | ................ | B23K 3/053 219/85.1 |
| 6,058,247 A * | 5/2000 | Lahey | ................... | B01D 1/0017 219/401 |
| 6,133,546 A | 10/2000 | Bains | | |
| 6,308,039 B1 * | 10/2001 | Haneda | .............. | G03G 15/2053 399/328 |
| 8,131,139 B1 * | 3/2012 | Gupta | ................... | F24H 1/0018 392/341 |
| 2004/0118939 A1 * | 6/2004 | Shank | ..................... | B60S 1/487 239/284.1 |
| 2005/0242770 A1 * | 11/2005 | Britto | ................. | H01R 13/7038 320/110 |
| 2006/0011071 A1 * | 1/2006 | Cho | ....................... | F24C 15/327 99/417 |
| 2009/0127478 A1 * | 5/2009 | Inoue | ....................... | G01J 3/108 250/504 R |
| 2012/0183281 A1 * | 7/2012 | Sato | ........................ | B60S 1/488 392/441 |
| 2014/0270725 A1 * | 9/2014 | Bertolini | .................. | B67D 7/82 392/341 |
| 2015/0068596 A1 * | 3/2015 | Ibara | ............... | H01L 31/022433 136/256 |
| 2015/0159535 A1 * | 6/2015 | Zigan | ........................ | F01N 5/02 60/615 |
| 2017/0203733 A1 * | 7/2017 | Sato | ........................ | B60S 1/488 |

FOREIGN PATENT DOCUMENTS

| | | | |
|---|---|---|---|
| JP | 60-171771 | | 11/1985 |
| JP | 1-60965 | | 4/1989 |
| JP | 160965 | * | 4/1989 |
| JP | 4-41447 | | 4/1992 |
| JP | 4-203752 | | 7/1992 |
| JP | 10-309935 | | 11/1998 |
| JP | 11-42935 | | 2/1999 |
| JP | 11042935 A | * | 2/1999 |
| JP | 11-109587 | | 4/1999 |
| JP | 2007-283935 | | 11/2007 |
| JP | 3176176 | | 5/2012 |
| JP | 2012-144194 | | 8/2012 |
| WO | 03/059710 | | 7/2003 |

OTHER PUBLICATIONS

International Preliminary Report on Patentability in Japan Patent Application No. PCT/JP2015/066391, dated Jan. 17, 2017.

* cited by examiner

WASHER FLUID HEATING DEVICE

TECHNICAL FIELD

The present invention relates to a washer fluid heating device.

BACKGROUND ART

As described in Patent Literature 1, a device having a configuration, in which a heating chamber is accommodated in a heat insulating and hot water storing chamber, and an electric heater is accommodated inside the heating chamber, has been known as a washer fluid heating device. A washer fluid is heated by the electric heater inside the heating chamber, and then supplied to a washer nozzle by driving of a washer pump, and sprayed from the washer nozzle. In such a heating device, when the washer fluid in the heating chamber decreases, there is concern that so-called no-water burning may occur. In the device described in Patent Literature 1, the washer fluid in the heat insulating and hot water storing chamber may be allowed to flow into the heating chamber when an outflow passage of the washer fluid is open at the upper portion of the heating chamber. In this way, the heating chamber is prevented from being empty, and no-water burning is prevented.

Meanwhile, as described in Patent Literature 2, a device in which a heater is provided in a tank of an electric water heater has been known. In this device, no-water burning is prevented by suspending heating when a temperature difference between a first thermosensor attached to a flange face of the heater and a second thermosensor attached to an external wall of the tank is greater than or equal to a set value.

CITATION LIST

Patent Literature

Patent Literature 1: Japanese Unexamined Patent Publication No. 2012-144194
Patent Literature 2: Japanese Unexamined Patent Publication No. H4-203752.

SUMMARY OF INVENTION

Technical Problem

In the washer fluid heating device, an opening formed at one end of the heating chamber is closed by a cover portion made of resin, rubber, etc. A proximal end portion of the heater is fixed to the cover portion. In such a configuration, when the washer fluid decreases, and thus a no-water burning state is generated, a temperature of the heater rises, and the heat is transferred to the cover portion. For this reason, there is concern that a member such as the cover portion made of resin, rubber, etc. may soften when detection of the no-water burning state is delayed.

An object of the invention is to provide a washer fluid heating device capable of immediately detecting a no-water burning state when a washer fluid inside a container decreases, thereby protecting a cover portion, etc. made of resin or rubber.

Solution to Problem

A washer fluid heating device of an aspect of the invention includes: a container that accommodates a washer fluid; a cover portion attached to one end of the container to face an accommodation space of the washer fluid; heating means that includes a case having a proximal end portion attached to the cover portion and extending toward the accommodation space, and a heating unit provided inside the case to heat the washer fluid inside the accommodation space through the case, and a detector for detecting a no-water burning state generated due to a decrease in washer fluid inside the accommodation space, wherein the heating unit is separated from the cover portion in an extending direction of the case; and the detector is provided inside the case and disposed on a side of the proximal end portion of the case from the heating unit.

According to the washer fluid heating device of the aspect of the invention, the cover portion is attached to the one end of the container, and the proximal end portion of the case of the heating means is attached to the cover portion. The heating unit is provided inside the case, and the heating unit heats the water fluid inside the accommodation space through the case. The heating unit is separated from the cover portion in the inside of the case that extends toward the accommodation space. Thus, when the inside of the accommodation space is filled with the washer fluid, heat by the heating unit is rarely transferred to the cover portion. Meanwhile, when the washer fluid inside the accommodation space decreases, the heat by the heating unit is not transferred to the washer fluid, and the so-called no-water burning state is generated. In this state, a temperature of the case rises, and the heat by the heating unit is easily transferred to the proximal end portion side through the case or the inside of the case. Herein, the washer fluid heating device includes the detector for detecting the no-water burning state. The detector is provided inside the case, and thus may immediately detect that heat is transferred to the proximal end portion side of the case. Further, the detector is disposed on the proximal end portion side from the heating unit, and thus may detect the no-water burning state at a position close to, the cover portion. When heating in the heating unit is adjusted depending on a detection result of the detector, it is possible to protect the cover portion, etc. made of resin, rubber, etc. from heat.

In addition, the detector may be disposed at the same position as a position of the cover portion or on a side of the heating unit from the cover portion in the extending direction of the case. Since the detector is disposed at the same position as that of the cover portion or on a side of the heating unit from the cover portion, when the no-water burning state is generated, the detector may detect heat generated by the no-water burning state at the same time when or before heat from the heating unit is transferred to the cover portion. Therefore, the effect that the cover portion made of resin, rubber, etc. is protected is further enhanced.

In addition, the detector may be buried in a filling portion filled with a filler inside the case. In this case, the heat from the heating unit is easily transferred to the detector by the filler. Therefore, the detector may rapidly and accurately detect the no-water burning state.

In addition, the filler may be a silicone-based adhesive. In this case, since the silicone-based adhesive having high heat conductivity is used as the filler, the detector may more rapidly detect the no-water burning state.

Advantageous Effects of Invention

According to an aspect of the invention, it is possible to immediately detect a no-water burning state, thereby protecting a cover portion, etc. made of resin or rubber.

DESCRIPTION OF EMBODIMENTS

Figure 1:
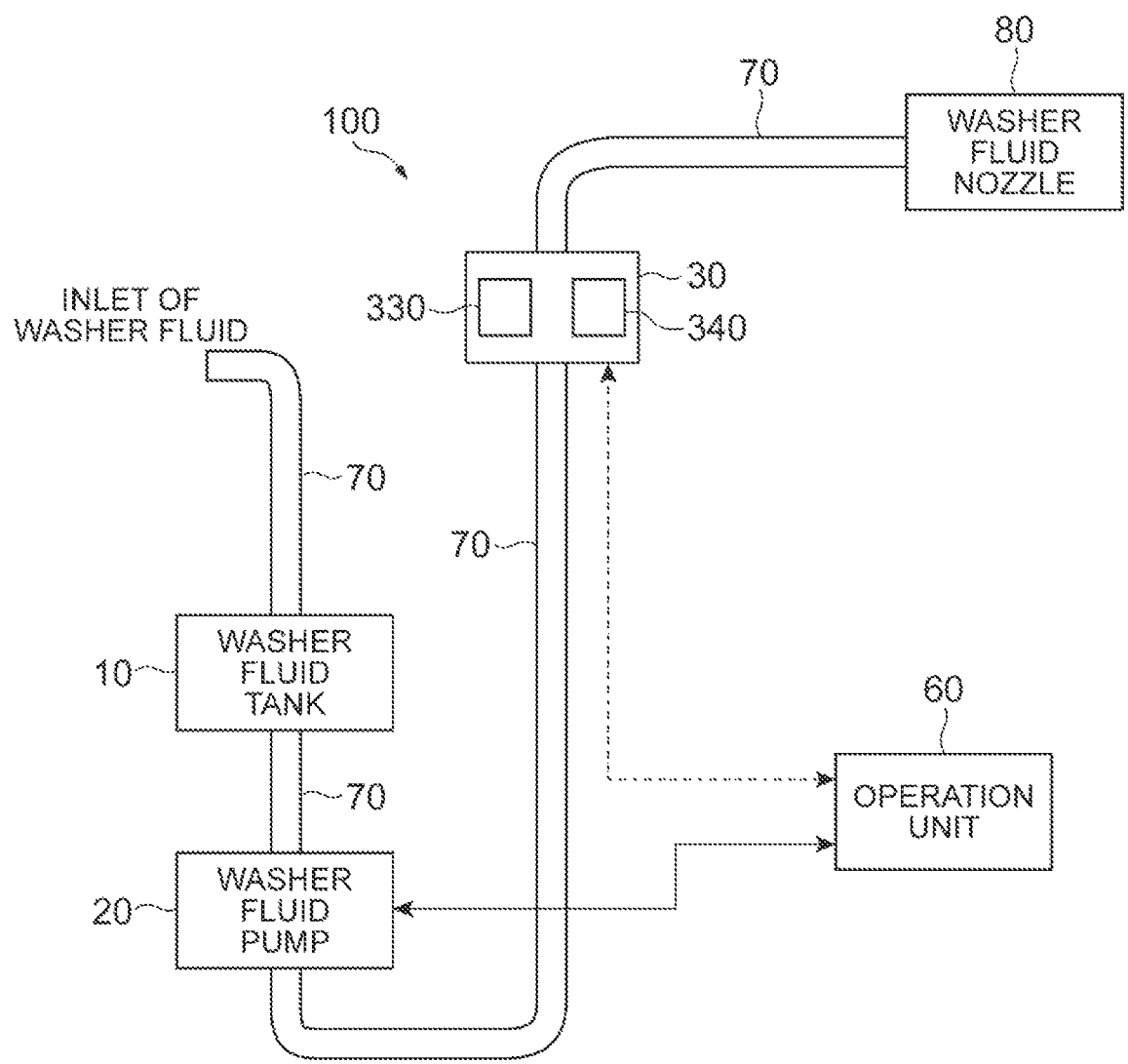
FIG. 1 is a diagram schematically illustrating a washer fluid supply system using an embodiment of the invention.

Hereinafter, an embodiment of the invention will be described with reference to drawings. The same reference numeral will be assigned to the same component in description of the drawings, and a repeated description will be omitted.

Hereinafter, a description will be given of an example in which a washer fluid heating device 30 according to an embodiment of the invention is applied to a washer fluid supply system of a vehicle. As illustrated in FIG. 1, a washer fluid supply system 100 includes a washer fluid tank 10 that stores a washer fluid, a washer fluid pump 20 provided at an outlet side of the washer fluid tank 10, and a washer fluid nozzle 80 provided to face a windshield of the vehicle. The supply system 100 further includes the washer fluid heating device 30 provided between the washer fluid pump 20 and the washer fluid nozzle 80. An operation unit 60 is connected to the washer fluid pump 20 and the washer fluid heating device 30. The washer fluid pump 20 may be operated when the operation unit 60 is operated by a driver, etc. of the vehicle. The above respective devices are connected by a duct 70. The washer fluid tank 10 is connected to an inlet of the washer fluid through the duct 70.

Figure 2:
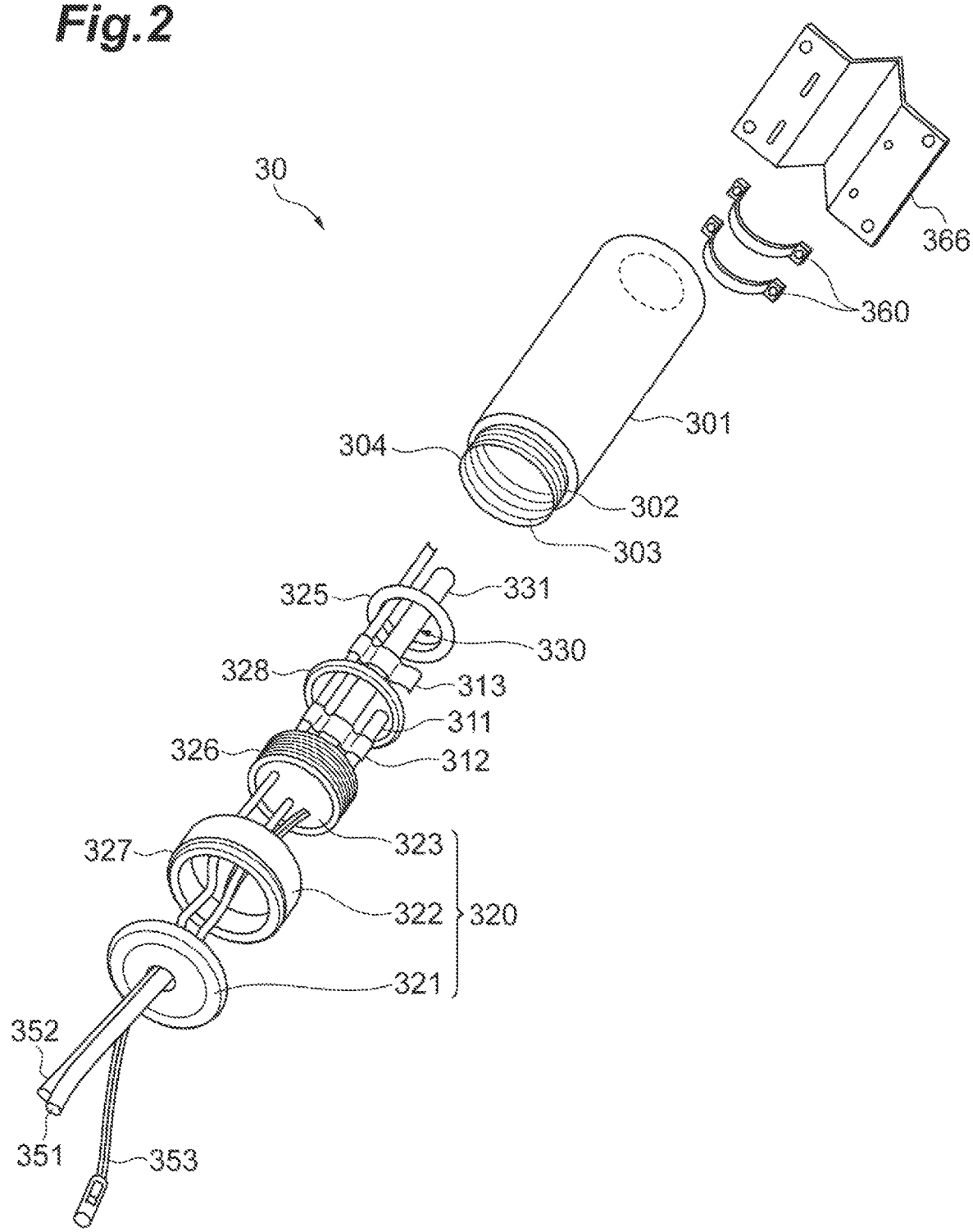
FIG. 2 is an exploded perspective view illustrating a washer fluid heating device of FIG. 1.
Figure 3:
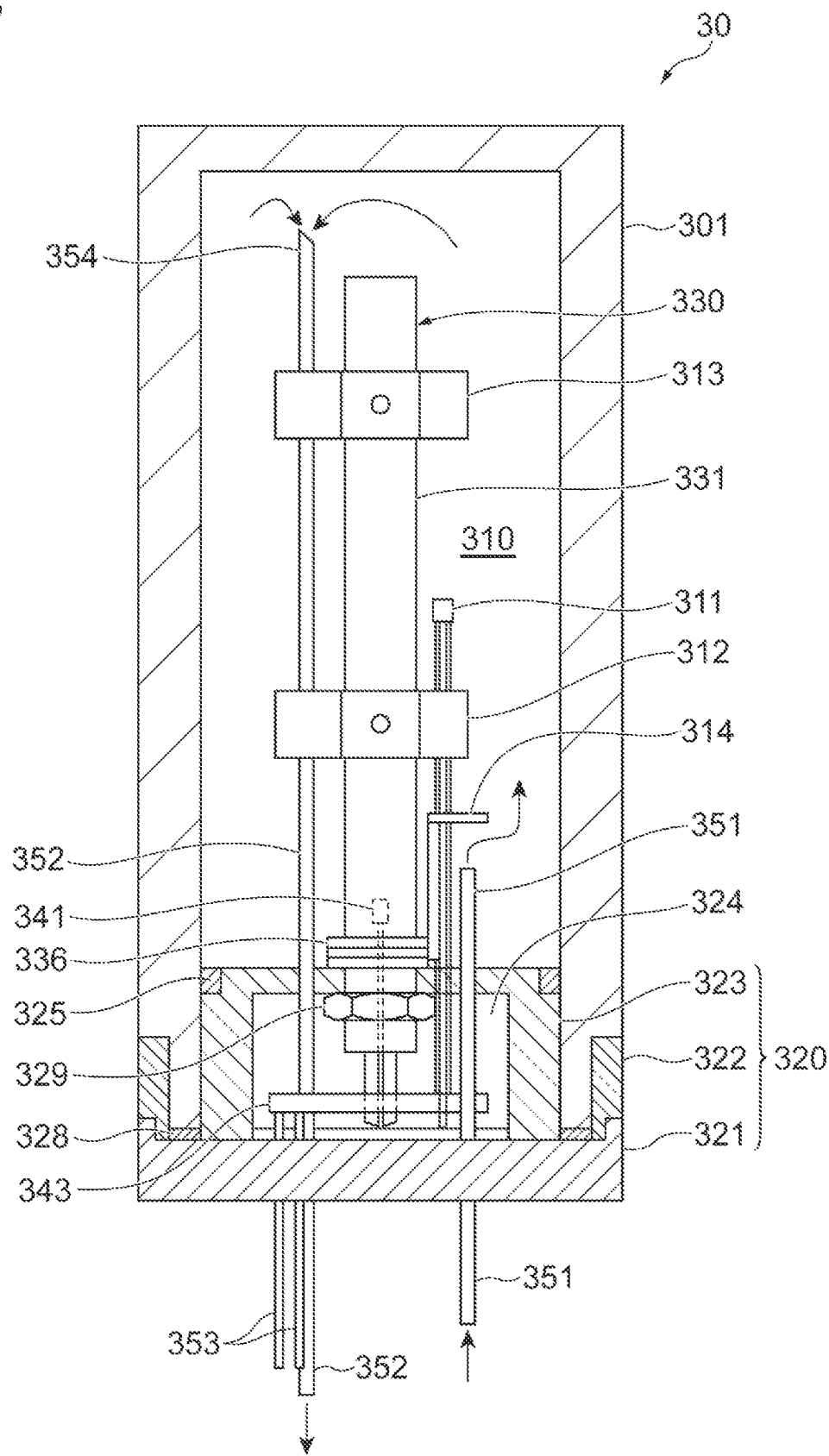
FIG. 3 is a cross-sectional view illustrating the washer fluid heating device of FIG. 1.

As illustrated in FIG. 2 and FIG. 3, the washer fluid heating device 30 includes a cylindrical container 301, a cover portion 320 attached to one end of the container 301 to close an opening 304 of the container 301, and heating means 330 having a proximal end portion attached to the cover portion 320 and extending toward an accommodation space 310.

The container 301 has the accommodation space 310 which accommodates the washer fluid, and is fixed to an inside of the vehicle by a plate-shaped support member 366 and a fixing band 360. The container 301 has the same structure as that of a vacuum bottle, and has an adiabatic structure to keep the washer fluid inside the accommodation space 310 warm. For example, an internal wall of the container 301 is made of metal such as stainless steel, or glass subjected to metal plating, etc. An external wall of the container 301 is made of metal such as stainless steel. A screw portion 302 is formed on an outer circumferential surface at the one end of the container 301 at which the opening 304 is formed, and a screw portion 303 is formed on an inner circumferential surface thereof. In the present embodiment, "lower" refers to the cover portion 320 side with respect to the container 301.

The cover portion 320 faces the accommodation space 310 of the washer fluid, and seals the accommodation space 310. The cover portion 320 includes an inside plug 323 facing the accommodation space 310, a cover 322 attached to the screw portion 302 provided on an outer circumferential surface of the opening 304, and an external cover 321 attached to the cover 322 to cover a lower surface of the inside plug 323. The external cover 321 is attached to the cover 322 by being screwed to a screw portion 327 formed at a lower side of an outer circumferential surface of the cover 322. A ring-shaped packing 328 is provided between the external cover 321 and an end surface of the container 301 on the opening 304 side. For example, the respective members included in the cover portion 320 are made of thermoplastic resin, and include polypropylene, etc.

A screw portion 326 is formed on an outer circumferential surface of the inside plug 323. The inside plug 323 is attached to the container 301 by screwing the screw portion 326 to the screw portion 303 of the opening 304 of the container 301. A groove portion for attaching a packing 325 is formed on an upper surface of the inside plug 323 along an outer circumferential portion thereof. The opening 304 of the accommodation space 310 is sealed by the inside plug 323 and the packing 325. A depression 324 which is hollow to the accommodation space 310 side and open downward is formed in the inside plug 323. A proximal end portion of a case 331 of the heating means 330 is attached to a bottom portion of the depression 324 by penetrating the bottom portion. The depression 324 is filled with urethane, etc., and a control board 343 is buried therein.

A washer fluid inflow pipe 351 and a washer fluid outflow pipe 352 are attached to the container 301. The washer fluid inflow pipe 351 and the washer fluid outflow pipe 352 extend to an inside of the accommodation space 310 by penetrating the cover portion 320. The washer fluid inflow pipe 351 is connected to the washer fluid pump 20 by the duct 70. The washer fluid outflow pipe 352 is connected to the washer fluid nozzle 80 by the duct 70.

A distal end of the washer fluid inflow pipe 351 is disposed in the vicinity of the inside plug 323 in an extending direction of the accommodation space 310 (a vertical direction of FIG. 3). An L-shaped current plate 314 is disposed above the distal end of the inflow pipe 351. The current plate 314 is attached to the proximal end portion side of the case 331 to guide the washer fluid flowing into the accommodation space 310 to approach a side of the container 301. A distal end 354 of the washer fluid outflow pipe 352 is disposed higher than a distal end of the case 331 of the heating means 330. An opening end surface of the distal end 354 of the outflow pipe 352 is inclined with respect to an inner bottom portion provided to be perpendicular to an extending direction of the container 301. By inclining the opening end surface, even when the distal end 354 of the outflow pipe 352 is disposed at a position reaching the inner bottom portion (upper end wall) of the container 301 of the heating device 30, the opening end surface may be prevented from coming into contact tightly with the bottom portion. In this way, the distal end 354 of the outflow pipe 352 may be prevented from being blocked by the inner bottom portion of the container 301, and the washer fluid may be smoothly taken into the outflow pipe 352.

A temperature sensor 311 is provided in the vicinity of a central part of the accommodation space 310 in the extending direction. The temperature sensor 311 is connected to the control board 343 stored in the depression 324 of the inside plug 323 by a lead wire. The lead wire of the temperature sensor 311, the case 331 of the heating means 330, and the washer fluid outflow pipe 352 are fixed by a holder 312 in the vicinity of the central part of the accommodation space 310 in the extending direction. A distal end portion of the washer fluid outflow pipe 352 and a distal end portion of the case 331 are fixed by another holder 313.

The temperature sensor 311 measures a temperature in the vicinity of the central part of the accommodation space 310. A device that measures a temperature may be used as the temperature sensor 311, and examples of the temperature sensor 311 may include a thermistor, a thermocouple, etc. The temperature sensor 311 measures a temperature of the washer fluid inside the accommodation space 310, and outputs the measured temperature to the control board 343. For example, heating adjustment means 340 (see FIG. 1) performs on/off control on a heating unit 339 of the heating means 330 (see FIG. 4) based on the temperature measured by the temperature sensor 311. In this way, the temperature of the washer fluid inside the accommodation space 310 is maintained at a desired temperature (for example, about 40° C.).

As illustrated in FIG. 1, the washer fluid heating device 30 includes a detector 341 for detecting a no-water burning state generated due to a decrease in washer fluid inside the accommodation space 310, and the heating adjustment means 340 that adjusts heating in the heating means when the no-water burning state is detected. Hereinafter, a description will be given of the heating means 330, the detector 341, and the heating adjustment means 340 with reference to FIG. 3 and FIG. 4. The heating means 330 includes the cylindrical case 331, and the heating unit 339 provided inside the case 331 to heat the washer fluid inside the accommodation space 310 through the case 331.

A screw portion 337 is formed in the proximal end portion of the case 331, and a flange 336 is formed at an upper side of the screw portion 337. The flange 336 is positioned inside the accommodation space 310. The case 331 penetrates the bottom portion of the depression 324 by a combination of the flange. 336 and a nut 329 screwed to the screw portion 337 inside the depression 324, and is fixed to the inside plug 323. The case 331 is configured in a non-adiabatic structure. Examples of a material contained in the case 331 include heat-resistant resin, ceramics, metal, etc.

Figure 4:
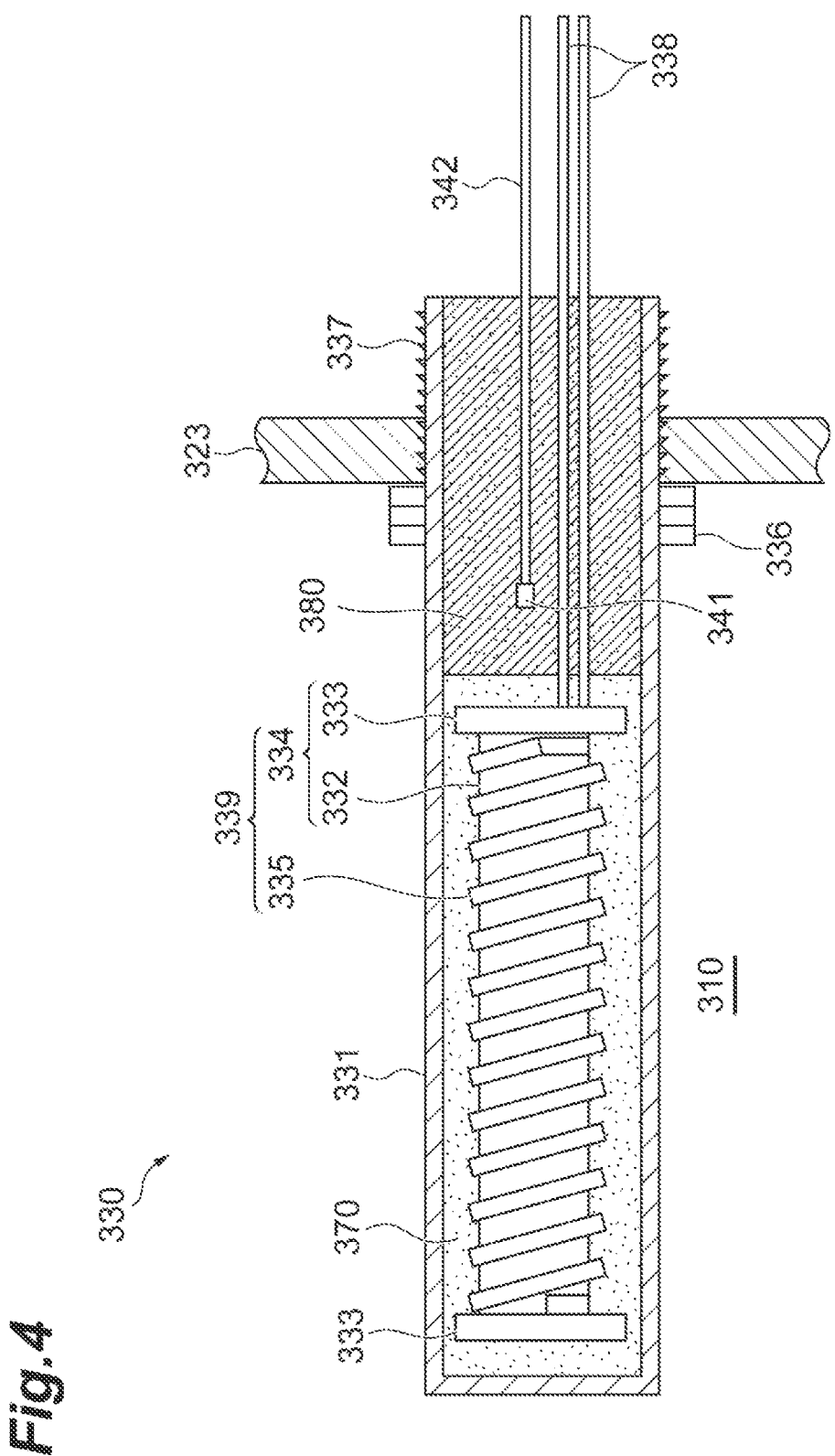
FIG. 4 is a cross-sectional view illustrating heating means of FIG. 3.

As illustrated in FIG. 4, the heating unit 339 includes a bobbin 334 provided to be separated from the inside plug 323 in the extending direction of the case 331, and an electric heating wire 335 wound around the bobbin 334. The bobbin 334 includes a round bar-shaped main body portion 332 and circular disc-shaped end portions 333 provided at both ends of the main body portion 332. The main body portion 332 and the end portions 333 are provided to be concentric with the cylindrical case 331. The electric heating wire 335 is wound around the main body portion 332. The electric heating wire 335 is connected to an electric wire 338 in the end portion 333 on the proximal end portion side of the case 331. The electric wire 338 is drawn from the end portion 333, and connected to the control board 343 inside the depression 324 of the inside plug 323. The electric heating wire 335 generates-heat by being electrified through the electric wire 338. The heat generated by the electric heating wire 335 heats the washer fluid inside the accommodation space 310 through the case 331.

The heating adjustment means 340 (see FIG. 1) includes the control board 343 stored in the depression 324 of the inside plug 323. The detector 341 and the control board 343 are connected by a lead wire 342. The detector 341 is disposed on the proximal end portion side of the case 331 from the end portion 333 of the heating unit 339 in the extending direction of the case 331. The detector 341 includes a sensor that detects a temperature. Examples of the detector 341 include a device that can measure a temperature such as a thermistor, a thermocouple, etc.

The control board 343 determines whether or not the heating means 330 is in a no-water burning state based on a detection result in the detector 341. The control board 343 includes a determination circuit for determining whether or not the heating means 330 is in the no-water burning state, and an adjustment circuit for adjusting power supplied to the heating unit 339. An external wire 353 that supplies power from an external power source is connected to the control board 343, and the external wire 353 is connected to the adjustment circuit of the control board 343.

Herein, the no-water burning state will be described. In a process of using the supply system 100, the washer fluid in the accommodation space 310 may decrease when the washer fluid inside the washer fluid tank 10 is insufficient, and when the washer fluid inside the container 301 evaporates. In this case, the washer fluid to be heated by the heating unit 339 decreases. In this way, the heating unit 339 is heated, and the heat is transmitted to the inside of the case 331 or the heating means 330. In the present embodiment, the no-water burning state refers to a state in which the heating means 330 is operated while the washer fluid inside the accommodation space 310 decreases or no washer fluid is present inside the accommodation space 310. In the no-water burning state, a temperature of a portion inside the heating means 330 and between the heating unit 339 and the cover portion 320 may increase to a certain temperature. Although not particularly restricted, for example, the certain temperature is a temperature close to a softening temperature of a member included in the cover portion 320 or lower than the softening temperature. As described in the foregoing, examples of the material of the cover portion 320 include resin. In this case, for example, the certain temperature is in a range of about 80° C. to 90° C.

When the no-water burning state is continued, a temperature of an outer surface of the heating means 330 may rise, and the member included in the cover portion 320 may start to soften. However, the detector 341 may immediately detect the no-water burning state, thereby preventing the member included in the cover portion 320 from softening. In other words, temperature stress is prevented from being applied to resin components such as the cover portion 320 including the inside plug 323, the packing 325, the packing 328, etc.

As described above, an internal space of the case 331 includes a heating space that accommodates the heating unit 339 in the extending direction, and a detection space in which the detector 341 is provided. The heating space is filled with a heat-resisting filler 370 such that a space between the bobbin 334 and an internal wall of the case 331 is filled up. A space including at least the end portion 333 on the proximal end portion side of the case 331 is filled with the heat-resisting filler 370. The heat-resisting filler 370 has high heat conductivity. A material having an electrically insulating property is preferable as the heat-resisting filler 370. For example, a material made of magnesium oxide is used as the heat-resisting filler 370. Magnesium oxide is excellent in heat conductivity and high-temperature insulating property, and thus heat generated in the heating unit 339 may be easily transmitted to the case 331 according to the heat-resisting filler 370 using the material made of magnesium oxide.

In addition, a filling portion 380 filled with a filler is provided in the detection space of the case 331. The detector 341 is buried in the filling portion 380. When the detector 341 is buried in the filling portion 380, generated heat inside the heating means 330 is efficiently transferred to the detector 341. Therefore, detection accuracy by the detector 341 is improved. Meanwhile, the detector 341 is fixed inside the case 331 by being buried in the filling portion 380. In this way, the detector 341 holds a stable position inside the case 331. For example, a silicone-based adhesive is used as the filler used for the filling portion 380 in consideration of heat conductivity.

The heat-resisting filler 370 that fills the inside of the case 331 and the filling portion 380 are connected in the extending direction. Therefore, when the no-water burning state is generated, heat is transferred from the heat-resisting filler 370 to the filling portion 380 in early state, and thus the no-water burning state may be immediately detected by the detector 341. The heat-resisting filler 370 and the filling portion 380 may be separated from each other.

Next, a description will be given of a method of operating the washer fluid supply system 100 using the washer fluid heating device 30 of the present embodiment.

For example, the washer fluid heating device 30 is operated when the driver, etc. turns ON an ignition key. In this way, the washer fluid inside the accommodation space 310 is heated to a desired temperature by the heating unit 339 through the case 331 of the heating means 330. Subsequently, when an operation command is sent to the washer fluid pump 20 by the driver, etc. operating the operation unit 60, the washer fluid stored in the washer fluid tank 10 is sent to the washer fluid heating device 30 by the washer fluid pump 20, and flows into the accommodation space 310 of the heating device 30 through the washer fluid inflow pipe 351. Accordingly, the washer fluid inside the heated accommodation space 310 flows into the distal end 354 of the washer fluid outflow pipe 352 disposed at an upper side of the accommodation space 310. By driving the washer fluid pump 20, the washer fluid inside the outflow pipe 352 is sent to the washer fluid nozzle 80 through the duct 70. The heated washer fluid is supplied to the windshield of the vehicle by this series of operations.

Herein, the no-water burning state of the heating means 330 may be generated when the washer fluid in the washer fluid tank 10 decreases or disappears. When the detector 341 incorporated in the case 331 detects a certain temperature, the heating adjustment means 340 suspends (or reduces) heating by the heating means 330. Therefore, temperature stress is prevented from being applied to the resin components such as the cover portion 320, etc. due to generation of no-water burning of the heating means 330.

According to the washer fluid heating device 30 of the present embodiment described above, the heating unit 339 is separated from the cover portion 320 in the inside of the case 331 which extends toward the accommodation space 310. Thus, when the inside of the accommodation space 310 is filled with the washer fluid, the heat by the heating unit 339 is rarely transferred to the cover portion 320. Meanwhile, when the washer fluid inside the accommodation space 310 decreases, the so-called no-water burning state is generated, and heat by the heating unit 339 is not transferred to the washer fluid. In this state, the heat by the heating unit 339 is easily transferred to the proximal end portion side through the case 331 or the inside of the case 331. Herein, since the detector 341 is provided inside the case 331, it is possible to immediately detect that heat is transferred to the proximal end portion side of the case 331. Further, since the detector 341 is disposed on the proximal end portion side from the heating unit 339, the no-water burning state may be detected at a position close to the cover portion 320. For example, when heating is adjusted by the heating adjustment means 340 depending on the detection result of the detector 341, the cover portion 320, etc. made of resin, rubber, etc. may be protected from heat. As a result, the member such as the cover portion 320, etc. made of resin, or rubber, etc. may be prevented from softening and being damaged.

In addition, the detector 341 is disposed at the same position as that of the cover portion 320 or on the heating unit 339 side from the cover portion 320. For this reason, when the no-water burning state is generated, the detector 341 may detect heat generated by the no-water burning state at the same time when or before heat from the heating unit 339 is transferred to the cover portion 320. Therefore, the effect that the cover portion 320 made of resin, or rubber, etc. is protected is further enhanced.

In addition, since the detector 341 is buried in the filling portion 380 filled with the filler inside the case 331, the heat from the heating unit 339 is easily transferred to the detector 341 by the filling portion 380. Therefore, the detector 341 may rapidly and accurately detect the no-water burning state.

In addition, since the silicone-based adhesive having high heat conductivity is used as the filler used for the filling portion 380, the detector 341 may more rapidly detect the no-water burning state.

Hereinbefore, descriptions have been given based on the present embodiment. However, the invention is not restricted to the above embodiment, and various modified embodiments may be adopted. For example, a notch, etc. may be formed at a portion of the distal end of the outflow pipe 352 instead of inclining the opening end surface of the distal end 354 of the outflow pipe 352. In this case, the distal end 354 of the outflow pipe 352 may be prevented from being blocked by the inner bottom portion of the container 301 similarly to a case in which the opening end surface of the distal end 354 is inclined. In addition, a description has been given of a case in which the detector 341 is disposed between the heating unit 339 and the inside plug 323 in the extending direction of the case 331. However, the detector 341 may be disposed at the same position as that of the inside plug 323. In this case, a temperature detected by the detector 341 is close to a temperature in the vicinity of the inside plug 323. Thus, when the no-water burning state is generated, the inside plug 323 may be suitably protected.

In addition, in the present embodiment, the device that may measure a temperature such as the thermistor, or the thermocouple, etc. is used as the detector 341. However, it is possible to use a detecting means such as a thermal fuse or a thermal switch or the like that directly interrupts electrification to the heating unit 339 when a certain temperature is reached. In this case, the detector 341 also has a function of the heating adjustment means that adjusts heating in the heating unit.

In addition, a description has been given of a case in which the silicone-based adhesive is used as the filler used for the filling portion 380. However, the filler is not restricted to the silicone-based adhesive. For example, it is possible to use an adhesive of another material such as an epoxy-based adhesive. Alternatively, for example, a silicone-based, modified silicone-based or urethane-based resin etc. having no adhesive action may be used as the filler.

In addition, a description has been given of a case in which the electric heating wire 335 is used in the heating unit 339 of the above embodiment. However, the invention is not restricted thereto, and it is possible to use a heat exchanging system that uses waste heat generated in an engine of the vehicle. In this case, an external power source is not necessary, and thus it is eco-friendly.

In addition, in the above embodiment, a portion including the inside plug 323, the cover 322, and the external cover 321 is used as the cover portion 320. However, only the inside plug may be used as the cover portion. In addition, an inside plug in which the depression is not formed may be used as the inside plug. Further, heating adjustment means that adjusts heating in the heating unit 339 (for example, the above-described control board 343, etc.) may be installed in a main body of the vehicle separately from the heating device 30.

In the above embodiment, a description has been given of a case in which the washer fluid heating device 30 is operated by an operation of turning ON the ignition key. However, the invention is not restricted thereto. As indicated by a broken line in FIG. 1, the operation unit 60 may be connected to the washer fluid heating device 30, and an operation switch of the heating device 30 may be disposed in the operation unit 60. In addition, the heating device 30 may be configured to operate by operating the operation switch.

INDUSTRIAL APPLICABILITY

According to an aspect of the invention, it is possible to immediately detect a no-water burning state, thereby protecting a cover portion, etc. made of resin or rubber.

REFERENCE SIGNS LIST

30 . . . washer fluid heating device
301 . . . container
310 . . . accommodation space
320 . . . cover portion
323 . . . inside plug
330 . . . heating means
331 . . . case
339 . . . heating unit
340 . . . heating adjustment means
341 . . . detector
380 . . . filling portion

The invention claimed is:

1. A washer fluid heating device comprising:
a container that accommodates a washer fluid;
a cover portion attached to a bottom end of the container to face an accommodation space of the washer fluid;
a heater structure that includes a case having a proximal end portion attached to the cover portion and extending in a vertical direction from the bottom end of the container towards a top end of the container, and a heater located inside the case to heat the washer fluid inside the accommodation space through the case; and
a temperature detector configured to detect a no-water burning state generated due to a decrease in washer fluid inside the accommodation space,
wherein the heater is separated from the cover portion in the vertical direction, and
the temperature detector is provided inside of the heater structure and positioned within the case at a position located below a lower end of the heater.

2. The washer fluid heating device according to claim 1, wherein the temperature detector is located at or above the cover portion in the vertical direction.

3. The washer fluid heating device according to claim 2, wherein the temperature detector is buried in a filling portion filled with a filler inside the case.

4. The washer fluid heating device according to claim 3, wherein a material contained in the filler includes a silicone-based adhesive.

5. The washer fluid heating device according to claim 1, wherein the temperature detector is buried in a filling portion filled with a filler inside the case.

6. The washer fluid heating device according to claim 5, wherein a material contained in the filler includes a silicone-based adhesive.

7. The washer fluid heating device according to claim 5, wherein a material contained in the filler includes an epoxy-based adhesive.

8. The washer fluid heating device according to claim 5, wherein a material contained in the filler includes at least one of a silicone-based resin, modified silicone-based resin and urethane-based resin without adhesive action.

9. The washer fluid heating device according to claim 1, wherein the temperature detector includes a thermal fuse or a thermal switch.

10. The washer fluid heating device according to claim 1, further comprising:
a heating adjustment structure configured to adjust heating of the heater structure.

11. The washer fluid heating device according to claim 1, further comprising:
an outflow pipe located in the accommodation space to allow the washer fluid in the accommodation space to flow out,
wherein a distal end of the outflow pipe is inclined with respect to the vertical direction.

12. The washer fluid heating device according to claim 1, further comprising:
an outflow pipe located in the accommodation space to allow the washer fluid in the accommodation space to flow out,
wherein a distal end of the outflow pipe comprises a notch.

13. The washer fluid heating device according to claim 1, wherein a material contained in the case includes at least one of heat-resistant resin, ceramics and metal.

14. The washer fluid heating device according to claim 1, wherein a temperature of the no-water burning state is in a range of about 80° C. to 90° C., when a material contained in the cover portion includes resin.

15. The washer fluid heating device according to claim 1, wherein an internal space of the case comprises a heating space that accommodates the heater in the vertical direction, and
the heating space is filled with a heat-resisting filler.

16. The washer fluid heating device according to claim 15, wherein a material contained in the heat-resisting filler includes magnesium oxide.

17. The washer fluid heating device according to claim 1, wherein the temperature detector is buried in a filling portion filled with a filler inside the case,
an internal space of the case comprises a heating space that accommodates the heater in the vertical direction,
the heating space is filled with a heat-resisting filler, and
the heat-resisting filler and the filling portion are connected in the vertical direction.

18. The washer fluid heating device according to claim 1, wherein the heater includes an electric heating wire.

19. The washer fluid heating device according to claim 1, wherein the heater includes a heat exchanging system using a waste heat generated in an engine of a vehicle.

* * * * *